Patented Aug. 31, 1948

2,448,408

UNITED STATES PATENT OFFICE 2,448,408

PARA-([N]-DIALKYL PYRRYL) BENZOATES

Souren Avakian, Oreland, Pa., assignor to The National Drug Company, Philadelphia, Pa., a corporation of Pennsylvania No Drawing. Application June 19, 1946, Serial No. 677,900

6 Claims. (Cl. 260—313)

This invention relates to a new class of benzoic acid derivatives and more particularly refers to dialkylpyrryl-N-alkylbenzoates.

It is an object of this invention to produce a new class of compounds particularly adapted for use in the pharmaceutical and related fields. A further object is to produce a class of benzoic acid derivatives on the benzene ring of which is substituted a pyrryl group, preferably a dialkylpyrryl group. Additional objects will become apparent from a consideration of the following description and claims.

These and other objects are obtained in accordance with the present invention wherein an ester of benzoic acid, which may be further substituted, is reacted with acetonylacetone.

The invention may be more readily understood by a consideration of the following illustrative examples.

EXAMPLE 1

*2,5-dimethylpyrryl-N-para-ethylbenzoate*

23 grams of acetonylacetone was added slowly to a solution of 33 grams of ethyl-para-aminobenzoate in 250 cc. of absolute alcohol containing 2 drops of hydrochloric acid. The reaction mixture was refluxed for 6 hours and then distilled under reduced pressure. A light yellow oil, boiling point 152–154° C./0.5 mm., distilled in quantitative yield. The oil solidified on standing, and after one crystallization from alcohol gave pure 2,5-dimethylpyrryl-N-para-ethylbenzoate, which melted at 90–91° C.

EXAMPLE 2

*2,5-dimethylpyrryl-N-para-diethylamino-ethylbenzoate*

A mixture of 23.6 grams of beta-diethylamino-ethyl-para-aminobenzoate and 17.1 grams of acetonylacetone containing 2 drops of acetic acid was heated in an oil bath at 130–135° C. for 3 hours. After cooling the mixture, it was treated with dilute hydrochloric acid, filtered, the filtrate made alkaline, and extracted with ether. Distillation of the dried ether solution gave 22.6 grams of a yellow oil boiling at 183–185° C./.5 mm. This product is 2,5-dimethylpyrryl-N-para-diethylamino-ethylbenzoate. Its hydrochloride melts at 184–185° C.

The same product may also be prepared in an alternative manner by reacting acetonylacetone and para-aminobenzoic acid to produce 2,5-dimethylpyrryl-para-benzoic acid, which is then reacted with beta-diethylamino chloride.

When the foregoing condensation was carried out in alcoholic solution, only 2,5-dimethylpyrryl-N-para-ethylbenzoate was obtained, due to interchange. This interchange likewise occurs when the product of this example is heated with ethyl alcohol.

It is to be understood that the above examples are illustrative merely of a few embodiments of this invention and that they may be varied widely with respect to the different reactants and the conditions of reaction without departing from the scope of the invention.

For instance, in place of the esters of benzoic acid employed in the example, esters of other alcohols, which may be further substituted, are contemplated. In place of ethylbenzoate, methylbenzoate or propylbenzoate may be employed, and the alkyl group may be further substituted, if desired, with additional radicals such as dialkylamino groups and the like. It is also to be understood that the benzene radical may be further substituted with substituents such as amino, alkyl, alkoxy, etc. groups.

It is to be further understood that in place of 2,5-dimethylpyrrole radical other related radicals may be employed. In this connection, reference may be made to the corresponding 3.5- or 3,4-derivatives. Instead of the methyl groups substituted on the pyrryl ring other alkyl groups may be used, for instance, ethyl, propyl, etc. Likewise, there may be but one substituent on this radical or more than two substituents, and instead of one or more of the alkyl groups other substituents such as alkoxy and the like groups may be used.

The compounds of this invention have a variety of uses in the industrial arts. They may be employed as intermediates, as surface-active agents, and in pharmaceutical preparations. In particular, they are of value as local anesthetics, and for this purpose their solutions may be injected or they may be compounded in tablets or ointments.

As many apparently widely different embodiments of this invention may be made without departing from the spirit and scope hereof, it is to be understood that the invention is not limited

I claim:
1. A compound corresponding to the general formula

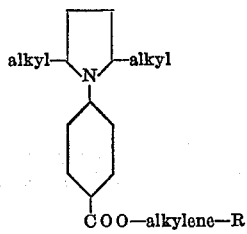

wherein R stands for a member of the group consisting of hydrogen and dialkyl amino groups.

2. An alkyl-para-([N]-dialkylpyrryl)benzoate.
3. An alkyl-para-([N]-dimethylpyrryl)benzoate.
4. An alkyl-para-([N]-2,5-dimethylpyrryl)benzoate.
5. Ethyl - para-([N]-2,5-dimethylpyrryl)benzoate.
6. Diethylaminoethyl-para-([N]-2,5-dimethylpyrryl)benzoate.

SOUREN AVAKIAN.

REFERENCES CITED

The following references are of record in the file of this patent:

Beilstein, Vierte Auflage Band XX, page 174.